(12) United States Patent
Yoon

(10) Patent No.: US 7,446,814 B2
(45) Date of Patent: Nov. 4, 2008

(54) CAMERA LENS ASSEMBLY FOR MOBILE COMMUNICATION TERMINAL

(75) Inventor: Tae-Jin Yoon, Osan-si (KR)

(73) Assignee: Samsung Electronics Co., Ltd (KR)

( * ) Notice: Subject to any disclaimer, the term of this patent is extended or adjusted under 35 U.S.C. 154(b) by 673 days.

(21) Appl. No.: 10/933,704

(22) Filed: Sep. 3, 2004

(65) Prior Publication Data

US 2005/0094025 A1    May 5, 2005

(30) Foreign Application Priority Data

Nov. 3, 2003    (KR)    ....................... 10-2003-0077346

(51) Int. Cl.
*H04N 5/225*    (2006.01)
(52) U.S. Cl. ........................ 348/376; 348/374; 348/375; 348/552; 455/90.3; 455/556.1; 455/575.1; 455/575.3; 16/277
(58) Field of Classification Search ................. 348/373, 348/374, 375, 333.1, 376, 552; 455/555, 455/90.3, 556.1, 575.1, 575.3; 16/266, 277, 16/278, 286, 321
See application file for complete search history.

(56) References Cited

U.S. PATENT DOCUMENTS

| | | | |
|---|---|---|---|
| 5,491,507 A * | 2/1996 | Umezawa et al. ........ | 348/14.02 |
| 6,965,413 B2 * | 11/2005 | Wada ......................... | 348/376 |
| 7,133,691 B2 * | 11/2006 | Kang ....................... | 455/556.1 |
| 7,146,200 B2 * | 12/2006 | Park et al. ................. | 455/575.3 |
| 7,269,442 B2 * | 9/2007 | Sato et al. ................ | 455/556.1 |
| 2003/0109232 A1 | 6/2003 | Park et al. | |
| 2004/0012701 A1 * | 1/2004 | Nagai et al. ............ | 348/333.12 |

FOREIGN PATENT DOCUMENTS

| | | |
|---|---|---|
| CN | 1183003 | 5/1998 |
| EP | 1 267 576 | 12/2002 |
| WO | WO 02/082674 | 10/2002 |

* cited by examiner

*Primary Examiner*—Lin Ye
*Assistant Examiner*—Chriss S Yoder, III
(74) *Attorney, Agent, or Firm*—The Farrell Law Firm, PC

(57) ABSTRACT

A camera lens housing in a mobile communication terminal adapted to provide an easy control to rotation of a lens housing as well as remove noises generated upon rotation of the lens housing. The camera lens assembly utilizes a set of bearings for supporting the rotation of the lens housing rotatably coupled into the mobile terminal, which provides significant noise reduction upon rotation of the lens housing. The control of rotation in the bearing using a plate spring provide more efficient and smooth adjustment in setting the desired direction of photographing of the lens housing, and it makes it possible to keep the fixing state of the lens housing more stable during photographing using the mobile phone with a camera.

5 Claims, 5 Drawing Sheets

CAMERA LENS ASSEMBLY FOR MOBILE COMMUNICATION TERMINAL

PRIORITY

This application claims priority under 35 U.S.C. § 119 to an application entitled "Camera Lens Assembly for Mobile Communication Terminal" filed in the Korean Intellectual Property Office on Nov. 3, 2003 and assigned Serial No. 2003-77346, the contents of which are incorporated herein by reference.

BACKGROUND OF THE INVENTION

1. Field of the Invention

The present invention relates generally to a mobile telephone terminal, and in particular, to a camera lens assembly for a foldable mobile telephone terminal rotatably coupled onto a center hinge arm of the terminal.

2. Description of the Related Art

A mobile telephone terminal is a portable mobile station that provides radio communication services to its subscriber while wirelessly communicating with its base station. Rapid development in the field of information and telecommunication business has made it possible for mobile users to use a variety of functions, and many types of mobile phones are available on the market. These mobile telephone terminals are generally classified into three or more types of terminals, such as a bar-type terminal, a flip-type terminal with a flip cover, and a foldable terminal with a folder adapted to be open and closed about a main body at a given angle.

In recent years, one of the most favorite trends in the marketplace has been mobile terminals that are designed to serve various additional functions as well as its basic wireless telephoning function for speaking on the phone with a called party. Such additional functions may include, for example, e-mail or data communication service, Internet game service, short message service, etc. Further, with a new generation of mobile communication system such as CDMA 1×EVDO having been actively introduced to the market, most of those up-to-date mobile terminals tend to extend their service capability to include image communications between mobile subscribers, moving picture service, etc. As such, the extension in service area of mobile phones to include image communications or moving picture service using mobile phones allows a camera lens to be added as one of the essential components in mobile phones recently on the market.

Such camera lenses adapted for mobile phones generally include two types of lenses, depending upon the configuration of the mobile phones, such as a fixed type camera lens having an exposed window formed through a periphery of a mobile phone, and a rotation type camera lens rotatably arranged onto a hinge axis of a folder type terminal.

FIG. 1 is a perspective view illustrating a conventional foldable mobile terminal 100 applied to the present invention with its sub-body unfolded, which terminal includes a main body 101 and a folder 102, the folder being rotatably coupled to the main body by means of a hinge assembly to allow a user to open or close the folder with respect to the main body 101 as desired. As seen in FIG. 1, the mobile terminal 100 has a pair of side hinge arms 115 and a center hinge arm 125 for coupling the main body 101 to the folder 102, and a lens housing 201 is arranged in an opening 127 (shown in FIG. 2) formed through the center hinge arm 125.

The main body 101 is configured such that a keypad assembly 111 and a microphone 113 are arranged on a front surface of the main body, and the two side hinge arms 115 each are positioned in the uppermost ends opposing each other. The folder 102 is configured such that the center hinge arm 125 is disposed in the lower end for coupling between the two side hinge arms 115, and a display unit 121 and a speaker 123 are arranged on a front surface facing the main body 101. As the center hinge arm 125 is coupled in between the two side hinge arms 115, the folder 102 is allowed to rotate about a hinge axis (A) extending through the side hinge arms 115 for opening or closure of the folder with respect to the main body 101. In the meantime, through the center hinge arm 125 is formed an opening or aperture 127 for receiving a lens housing 201 in a direction intersecting the hinge axis (A).

FIG. 2 is an exploded perspective view for illustrating the disassembled configuration of a camera lens assembly of a mobile communication terminal according to the prior art, and FIG. 3 is an exploded perspective view for illustrating in further detail the camera lens assembly shown in FIG. 2. As shown in FIGS. 2 and 3, the camera lens assembly of a mobile terminal according to the prior art is rotatably coupled to for the center hinge arm 125 in the opening 127 formed through the center hinge arm 125 of the folder 102, both ends of the camera lens assembly being supported by a hinge dummy 203 and a hinge module 209. The camera lens assembly is provided with cylindrical lens housing 201 in which a camera lens is installed. The cameral lens housing 201 has an exposed window 211 in its periphery and has a supporting recess 213 in its one end, and a housing holder 215, as shown in FIG. 3, is coupled with the other end. The housing holder 215 may be of an annular plate shape, on one side of which a plurality of serration holes 219 are arranged at intervals of even distance along its circumferential direction. The housing holder 215 is fixed to the opposite end of the lens housing 201 by means of fasteners such as screws.

The hinge module 209 is accommodated in the center hinge arm 125 for generation of a rotating force to open or close the folder 102. The construction of this hinge module 209 is disclosed in further detail in a Korean Patent No. 296048 issued on May 7, 2001 to the same assignee as the present application, the content of which is incorporated herein by reference. Further, the hinge module 209 is provided with a supporting protrusion (not shown) for supporting the lens housing 201 so that the supporting protrusion extends to one end of the opening 127. The supporting protrusion may be accommodated within the hinge module 209 or a hinge bore 125b in which the hinge module 209 is received, which is adapted to extend to one end of the opening 127 so that it is rotatably coupled with supporting recess 213 in one end of the lens housing 201.

The other end of the lens housing 201 is supported by a hinge dummy 203, which is fixedly coupled to the side hinge arm 115 and also rotatably coupled with a rotation hole 125a in the center hinge arm 125, its end being adapted to support the other end of the lens housing 201. As such, the hinge dummy 203 is configured to provide a hinge coupling in between the main body 101 and folder 102 and to support the other side to provide a pivot axis for the lens housing 201.

The hinge dummy 203 cylinder shaped, with one side of which a cap-shaped pin holder 237 is coupled. The pin holder 237 is fastened to one end of the hinge dummy 203 using fastening means such as screws, and spring pins 235 are positioned inside the pin holder, in such a way that they appear and disappear, either outwardly or inwardly, in a direction towards the lens housing 201 facing the housing holder 215. The spring pins 235 functions to protrude through pin holder 237 with help of elastic force provided by a coil spring. When the lens housing is caused to rotate, the spring pins 235 move following the traces of the pinhole 219 in the housing holder 215. Thus, the spring pins 235 move following the traces formed by the serration holes 219, engaging each other to thereby provide its user with feeling of clicks.

It has been appreciated however, that a camera lens assembly in such a prior art mobile telephone terminal may have a significant disadvantage in that too much extra noise is generated in between a spring pin and a housing holder arranged in one end of the lens housing. Moreover, the vertical movement of a pin by means of a spring is sometimes not so smooth, which will hinder precise rotation of the lens housing.

SUMMARY OF THE INVENTION

It is, therefore, an object of the present invention to provide a camera lens housing for a mobile communication terminal adapted to provide an easy control to rotation of a lens housing as well as to control noise generation upon rotation of the lens housing.

To achieve the above and other objects of the present invention, there is provided a camera lens assembly for a mobile communication terminal having a main body with a plurality of side hinge arms arranged to face each other in one side end of the main body, and a folder with a center hinge arm extending from one side end thereof, the center hinge arm being interposed between the side hinge arms for coupling the main body and the folder, the camera lens assembly comprising: an opening with a predetermined length arranged in a center area of the center hinge arm in its lengthwise direction; a hinge module positioned within the center hinge arm, the hinge module having a supporting protrusion projected through one end of the opening; a bearing rotatably coupled with an inner ring and an outer ring on the same axis, the inner ring being fixed to the supporting protrusion; an elastic means equipped in one end of the opening, extending along the circumferential direction of the supporting protrusion, for pressing on the outer ring of the bearing; and a lens housing rotatably coupled within the opening, the lens housing being cylindrically shaped and having at least one coupling groove in one end for coupling to the outer ring.

Preferably, in the camera lens assembly, the elastic means is made of a plate spring comprising at least one spring protrusion projecting in curvature in the direction of the outer ring of the bearing, and the outer ring of the bearing is provided with a plurality of spring grooves respectively matching to the spring protrusions in a surface facing the plate spring.

More preferably, the camera lens assembly further comprises a hinge dummy disposed within the center hinge arm, projecting towards the other end of the opening, and a supporting groove rotatably coupled with the hinge dummy and arranged in the other end of the lens housing.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
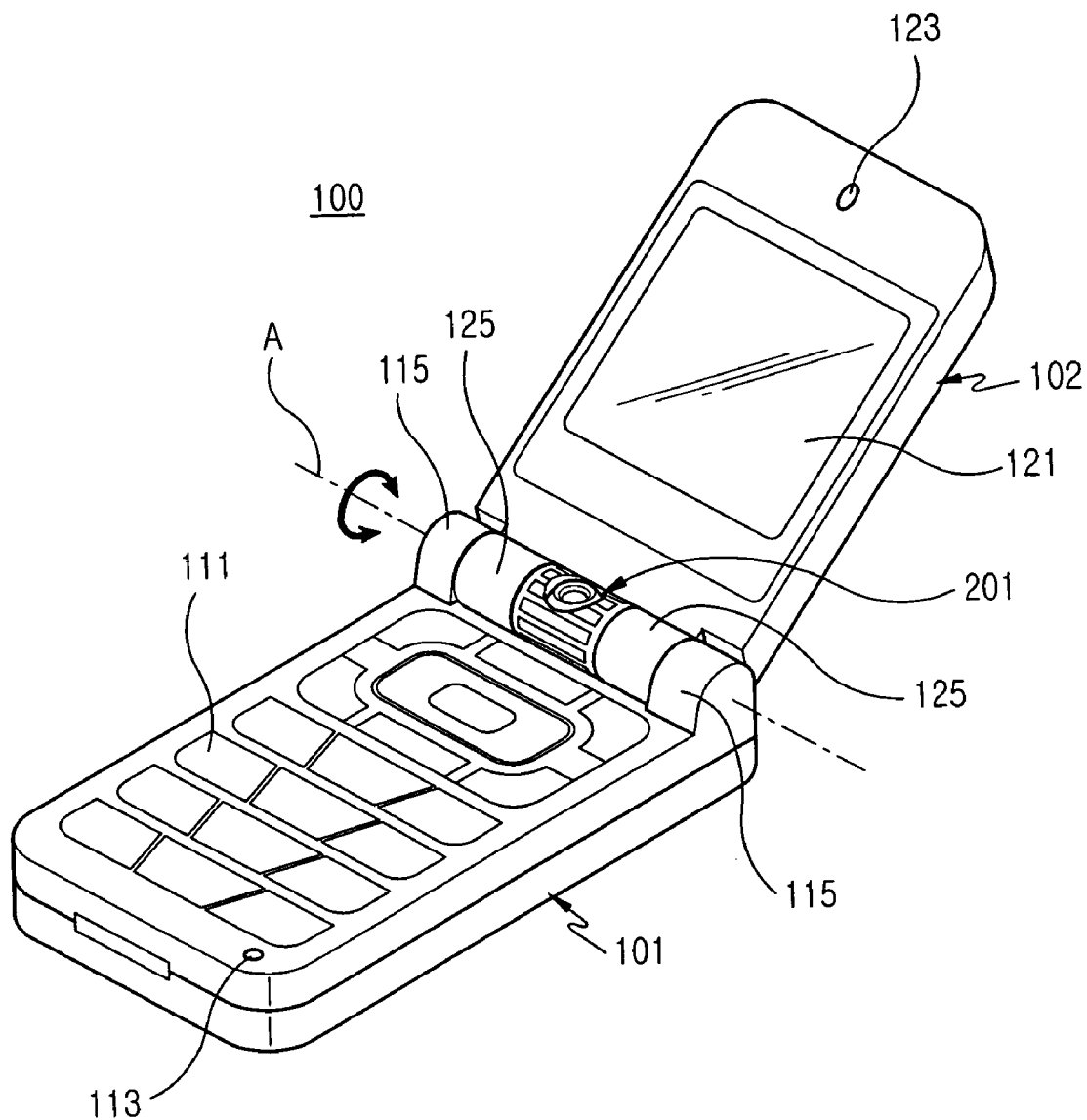
FIG. 1 is a perspective view illustrating a conventional mobile phone to which the present invention is applied.
Figure 2:
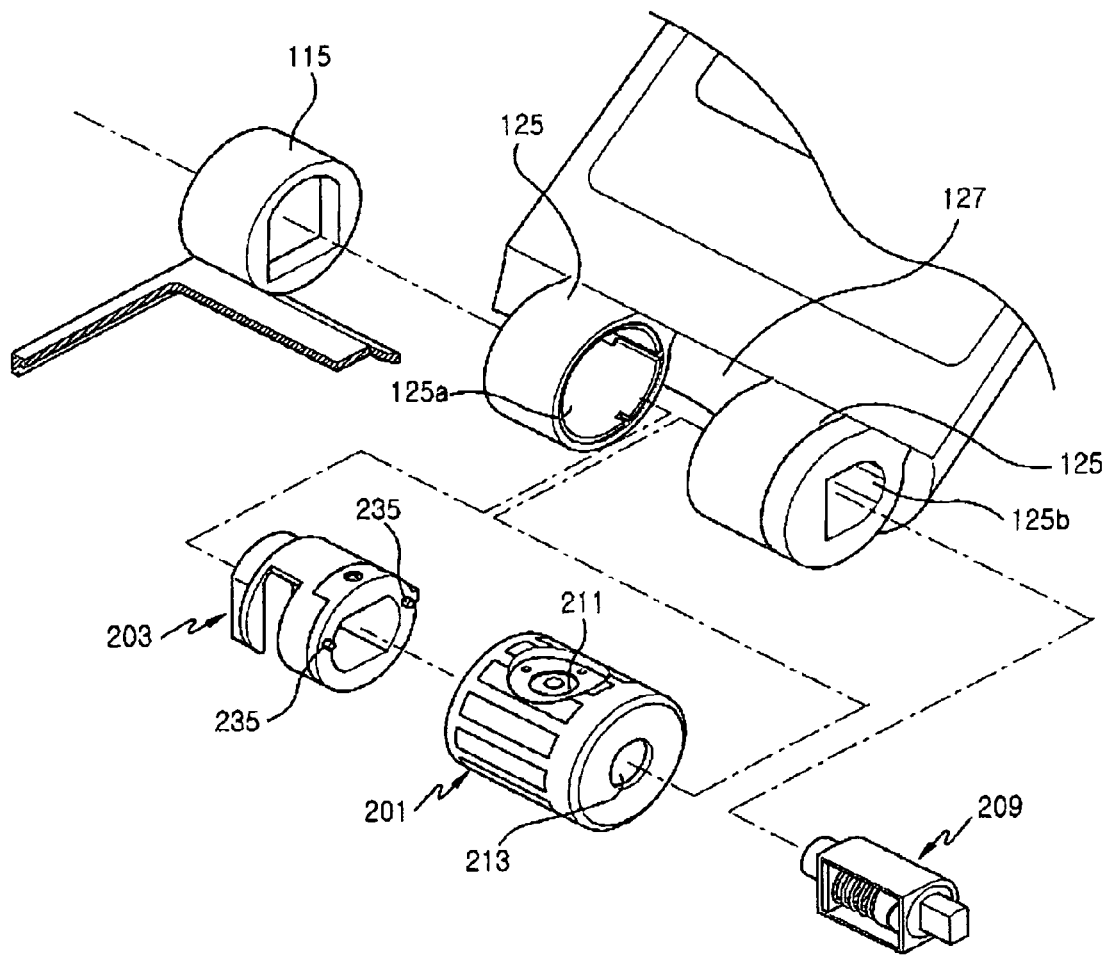
FIG. 2 is an exploded perspective view illustrating the disassembled configuration of a camera lens assembly of a mobile communication terminal according to the prior art.
Figure 3:
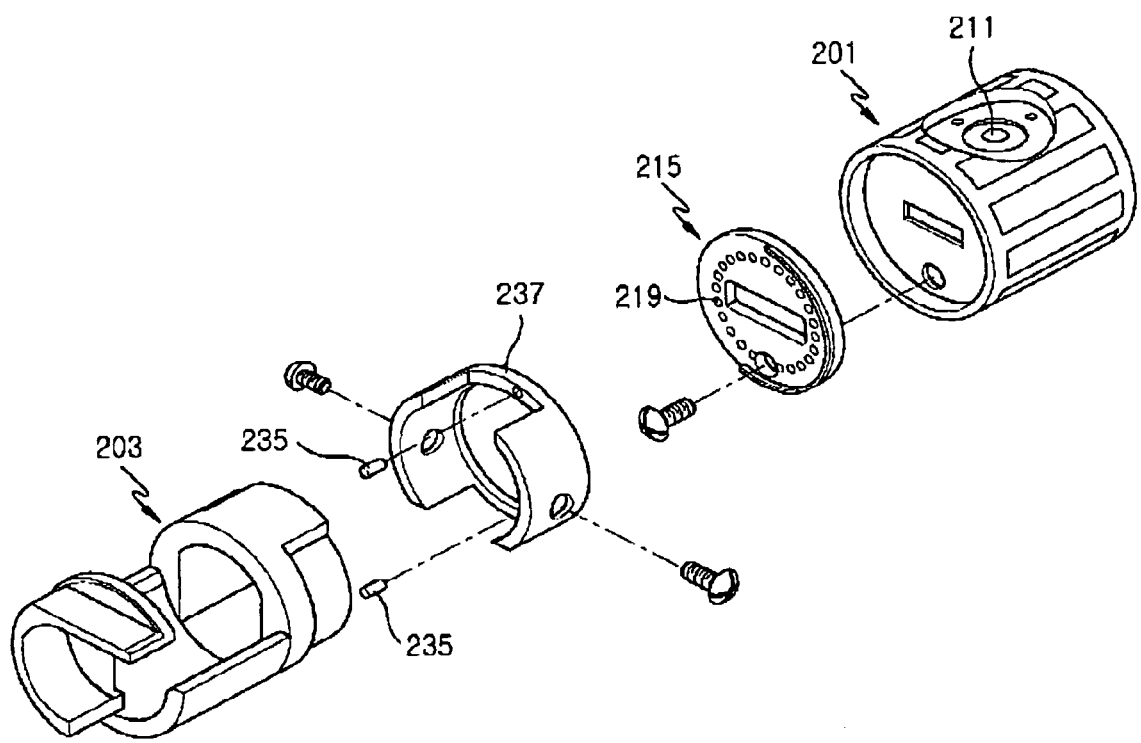
FIG. 3 is an exploded perspective view illustrating in further detail the camera lens assembly shown in FIG. 2.

A preferred embodiment of the present invention will be described hereinafter with reference to the accompanying drawings. In the following description, well-known functions or constructions are not described in detail since they would obscure the invention in unnecessary detail. Like reference numerals are intended to represent like components.

Figure 4:
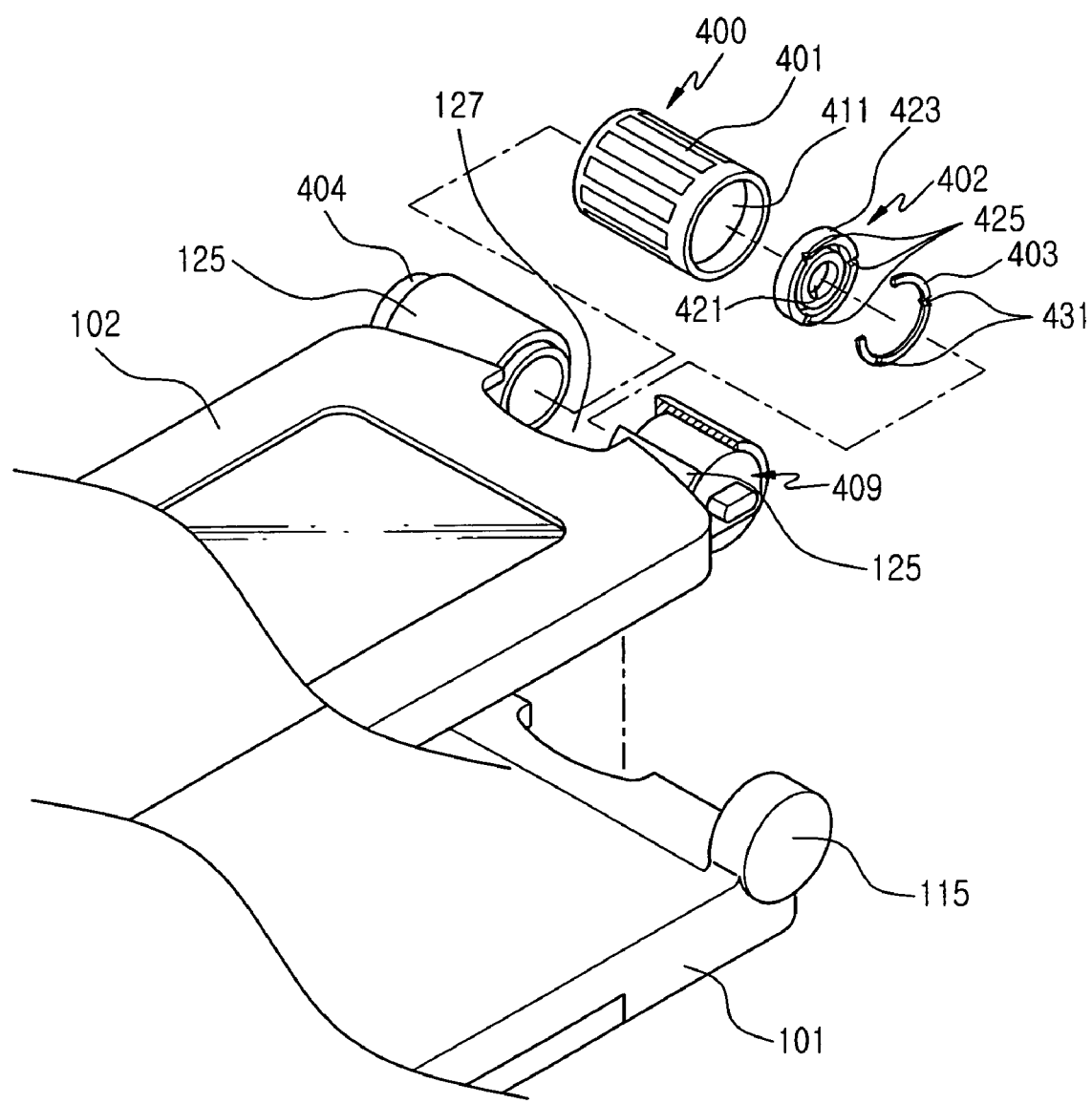
FIG. 4 is an exploded perspective view illustrating a camera lens assembly in a mobile communication terminal according to a preferred embodiment of the present invention.
Figure 5:
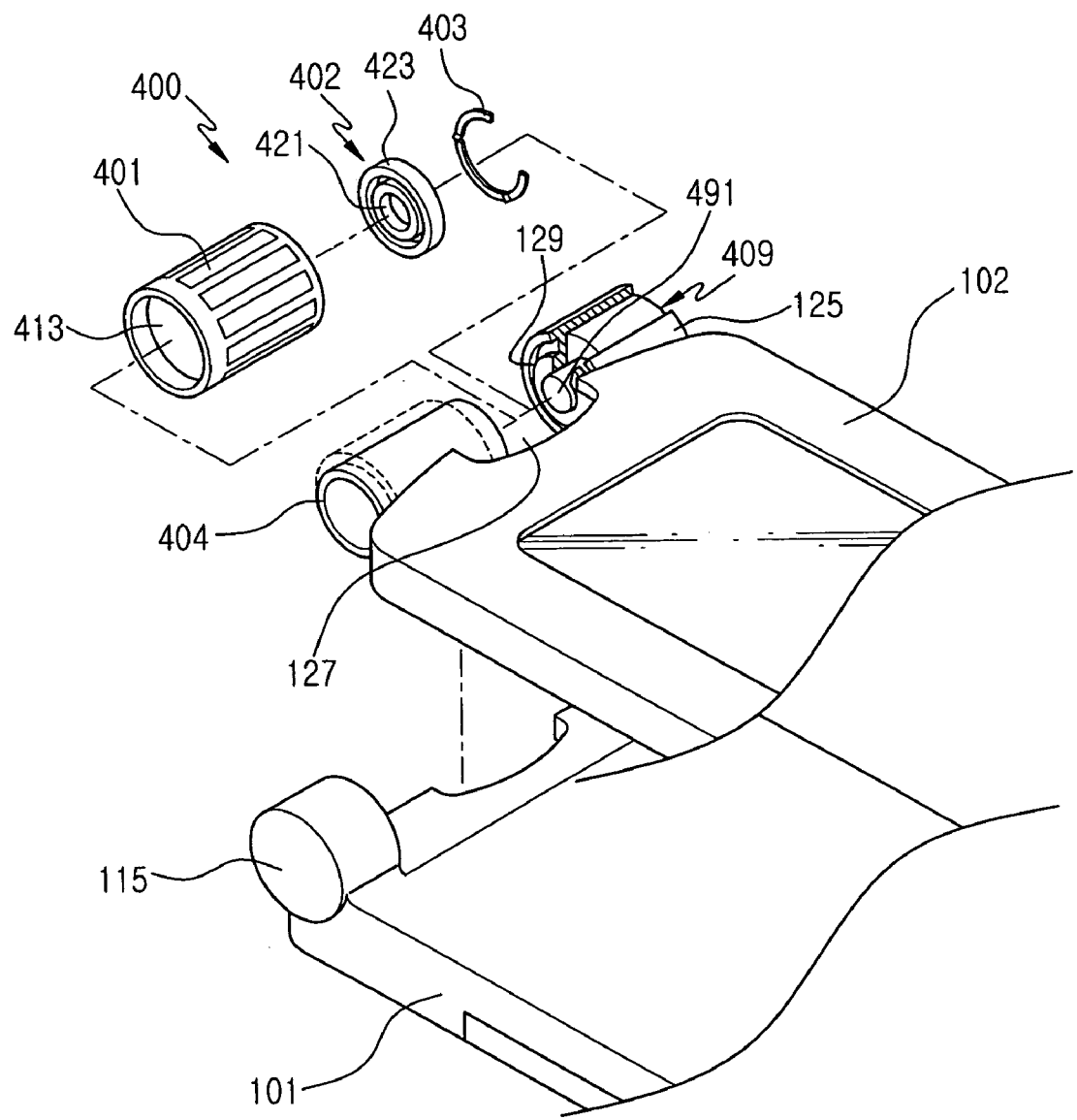
FIG. 5 is an exploded perspective view illustrating in the opposite direction the camera lens assembly shown in FIG. 4.

Referring now to FIG. 4, which shows a perspective view in sections for a camera lens assembly 400 in a mobile communication terminal according to a preferred embodiment of the present invention, and then to FIG. 5, which shows a perspective view in sections taken in the opposite direction for the camera lens assembly 400 shown in FIG. 4, the camera lens assembly 400 according to the preferred embodiment of the present invention has a lens housing 401, a bearing 402, and a plate spring 403. A hinge dummy 404 and a hinge module 409 are configured to support both ends of the lens housing 401, respectively, and the lens assembly is rotatably coupled within an opening 127 formed in one end, for instance, in the uppermost side end of the mobile terminal.

The mobile terminal according to the present invention has a main body 101 with two side hinge arms 115 extending from each top end of the main body, the two side hinge arms being arranged to face each other, and a folder 102 with a center hinge arm 125 extending from the bottom end of the folder, for rotatably coupling with the main body 101 between the two side hinge arms 115. The lens housing 401 is rotatably coupled within an opening 127 formed through the center hinge arm 125.

The lens housing 401 is generally in the form of cylinder and has a camera lens assembly inside it. On one end of a circumferential surface of the lens housing is formed an opening (not shown) for exposure of the camera lens. A coupling recess 411 (FIG. 4) and a supporting recess 413 (FIG. 5) are formed in both ends of the lens housing 401, for rotatably coupling onto the opening 127 in the center hinge arm 125. In a preferred embodiment, coupling recess 411 and supporting recess 413 each are designed to have a predetermined depth of recessed portion in the lengthwise direction of the lens housing 401.

In both ends of the opening 127 is positioned a means for rotatable supporting the lens housing 401. Further, in one end of the opening 127 are arranged a supporting protrusion 491 and a bearing acting as a means for supporting rotation of the lens housing 401, while in the other end of it is arranged a hinge dummy 404.

The supporting protrusion 491 is arranged to be accommodated in the hinge module 409 to thereby couple with the center hinge arm 125, so that the supporting protrusion protrudes towards one end of the opening 127. Although, in this embodiment of the invention the supporting protrusion 491 is shown to be accommodated in the hinge module 409, an alternative configuration may be implemented in such a way that after the supporting protrusion 491 protrude into the center hinge arm, the hinge module 409 is caused to be coupled with the center hinge arm 125, thereby allowing the supporting protrusion 491 to protrude into one end of the opening 127 for fixing within the center hinge arm 125.

An inner ring 421 and an outer ring 423 of the bearing 402, which is preferably in the form of a radial bearing with a ball assembly (not shown) interposed between the inner and outer rings, are arranged in alignment with the same axis, so that the inner ring 421 is coupled with the supporting protrusion 491 while the outer ring 423 is coupled to the coupling recess 411 of the lens housing 401, thereby allowing a rotational movement with the lens housing 401. Therefore, it will be appreciated that for the purpose of rotatably coupling the lens housing 401 to the opening 127, the bearing 402 is utilized to effect considerable reduction in the noises produced during rotation of the lens housing 401.

The hinge dummy 404 is rotatably coupled with respect to the center hinge arm 125 and protrudes towards the other end of the opening 127. Further, the hinge dummy 404 is coupled with the side hinge arm 115 of the main body 101 to provide a hinge axis for the folder 102. The end section of the hinge dummy 404 that protrudes towards the other end of the opening 127 is rotatably coupled to the supporting recess 413 of the lens housing 401 (in FIG. 5).

As described in the above, the bearing 402, coupled to the supporting protrusion 491, and the hinge dummy 404 are configured to support both ends of the lens housing 401, thereby constructing a rotation axis of the lens housing 401. Furthermore, although in this particular embodiment the bearing 402 is installed only in one side of the lens housing 401, it would be apparent to those skilled in the art that such a bearing may be installed in both sides of the lens housing.

In the meantime, it will be noted that when a user intends to take a picture of a subject using the camera lens assembly 400, the lens housing 401 needs to be fixed with respect to the main body without rotation. In order to fix the lens housing 401 for taking pictures, the camera lens assembly 400 is provided with a plate spring 403 being disposed in one end of the opening 127. The mounting of the plate spring 403 onto the lens housing is carried out using a recess 129 adapted to receive the plate spring, the recess being arranged in one end of the opening 127 along the circumferential direction about the periphery of the supporting protrusion 491. The plate spring 403 is disposed within the recess 129 to compress the outer ring 423 of the bearing 402. As such, the pressing of the plate spring 403 onto the outer ring 423 makes it possible to control rotation of the lens housing 401, so that it prevents the lens housing 401 from moving freely, keeping the position of the lens housing 401 more stable while taking a picture of a subject using the mobile phone. As the plate spring 403 functions to press onto the outer ring 423 of the bearing 402, a user of the mobile phone can adjust the direction of photographing in the lens housing 401 by applying a given level of rotating force thereto, and then after rotation of the lens housing to the desired photographing direction, the lens housing can be kept in a fixed position stably.

Further, the plate spring 403 is curved to be configured in a C-shape, partially annular, and may be provided with at least one spring protrusion 431 extending in the direction of the outer ring 423. The spring protrusion 431 serves to secure the lens housing 401 more stably in the photographing position. In the periphery of the outer ring 423 of the bearing 402 are disposed a plurality of notches or spring grooves 425 for receiving the spring protrusions 431. As such, when the lens housing 401 is disposed in the photographing position, the spring protrusions 431 are in engagement with the spring grooves 425 to fix the lens housing 401. According to the preferred embodiment of the invention, by way of example, three spring grooves 425 are formed along the periphery of the outer ring 423 at given intervals of degree. That is to say, in this embodiment, the lens housing 401 can be firmly kept in the three fixed positions corresponding to the directions defined by the three grooves. However, even though the spring protrusion 431 is not in such a engaged position with the spring groove 425, it would be possible to prevent any unnecessary free movement in the lens housing 401 which is not intended by the user of mobile phone because of the pressure applied by the spring protrusion 431 pressing against the outer ring 423. In the meantime, although the preferred embodiment of the invention described heretofore shows that such a plate spring 403 is used to press the outer ring 423 of the bearing 402, various different types of elastic means may be utilized having enough elasticity to press against the outer ring 423 as required.

As understood from the foregoing description, the camera lens assembly in a mobile terminal according to the present invention utilizes a set of bearings for supporting the rotation of the lens housing coupled to the mobile terminal, which allows significant noise reduction upon rotation of the lens housing. Furthermore, the control of rotation in the bearing by means of a plate spring will allow more efficient and smooth adjustment in setting the desired direction of photographing in the lens housing, and it makes it possible to keep the fixed state of the lens housing more stable during photographing using the mobile phone with the camera.

While the present invention has been shown and described with reference to preferred embodiments thereof, it will be understood by those skilled in the art that various changes and modifications in form and details may be made therein and equivalents may be substituted for elements thereof, without departing from the spirit and scope of the invention as defined by the appended claims.

What is claimed is:

1. A camera lens assembly in a mobile communication terminal having a main body with a pair of side hinge arms arranged to face each other at one end of the main body, and a folder with a center hinge arm extending from one end thereof, the center hinge arm being interposed between the side hinge arms for coupling the main body and the folder, the camera lens assembly comprising:

an opening with a predetermined length arranged in a center area of the center hinge arm in a lengthwise direction;

a hinge module positioned within the center hinge arm, the hinge module having a supporting protrusion projecting through one end of the opening;

a bearing having an inner ring and an outer ring on the same axis, the inner ring being fixed to the supporting protrusion;

an elastic means being arcuate in shape and extending along circumferential direction of the supporting protrusion; and a lens housing rotatably coupled within the opening, the lens housing being cylindrically-shaped and having at least one coupling groove in one end for coupling to the outer ring, wherein the elastic means presses onto the outer ring so that the lens housing is kept in a fixed position stably after rotation of the lens housing to the desired photographing direction.

2. The camera lens assembly in a mobile communication terminal according to claim 1, wherein the elastic means is a plate spring having at least one spring protrusion projecting towards the outer ring of the bearing, and wherein the outer ring of the bearing is provided with a plurality of spring grooves respectively matching to the spring protrusions in a surface facing the plate spring.

3. The camera lens assembly in a mobile communication terminal according to claim 1, further comprising a hinge dummy disposed within the center hinge arm, projecting towards the other end of the opening, and a supporting groove rotatably coupled with the hinge dummy and arranged in the other end of the lens housing.

4. A camera lens assembly in a mobile communication terminal, the terminal having a main body with a pair of side hinge arms for coupling with a center hinge arm of a folder to define a hinge assembly for the terminal, the camera lens assembly comprising:

- a camera lens housing rotatably disposed in an opening provided in the center hinge arm, the lens assembly being cylindrically-shaped and having at least one coupling groove disposed at an end thereof;
- a hinge module disposed in the center arm and having a supporting protrusion at one end projecting in a direction of the opening in the center hinge arm;
- a bearing having an inner ring and an outer ring concentric with the inner ring, the inner ring being secured to the supporting protrusion; and
- an elastic plate spring being arcuate in shape and extending circumferentially about the supporting protrusion to press against the outer ring of the bearing,
- wherein the plate spring includes at least one spring protrusion for engaging at least one spring groove of the outer ring to fix the position of rotation of the camera lens housing.

5. A camera lens assembly in a mobile communication terminal having a main body with a pair of side hinge arms arranged to face each other at one end of the main body, and a folder with a center hinge arm extending from one end thereof, the center binge arm being interposed between the side hinge arms for coupling the main body and the folder, the camera lens assembly comprising:

- an opening arranged in a center area of the center hinge arm in a lengthwise direction;
- a hinge module positioned within the center hinge arm, the hinge module having a supporting protrusion projecting through one end of the opening;
- a bearing having an inner ring and an outer ring on the same axis, the inner ring being fixed to the supporting protrusion;
- an elastic member being arcuate in shape and extending along a circumferential direction of the supporting protrusion, for pressing against the outer ring of the bearing; and
- a lens housing rotatably coupled within the opening, the lens housing being cylindrically-shaped and having at least one coupling groove in one end for coupling to the outer ring,
- wherein the elastic member has at least one spring protrusion projecting towards the outer ring of the bearing and the outer ring of the bearing is provided with a plurality of spring grooves respectively matching to the spring protrusions in a surface facing the plate spring.

* * * * *